(12) United States Patent
Ogihara (10) Patent No.: US 11,183,686 B2
(45) Date of Patent: *Nov. 23, 2021

(54) ELECTROLYTE, ENERGY STORAGE DEVICE, AND METHOD FOR PRODUCING ENERGY STORAGE DEVICE

(71) Applicant: KABUSHIKI KAISHA TOYOTA CHUO KENKYUSHO, Nagakute (JP)

(72) Inventor: Nobuhiro Ogihara, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,725

(22) Filed: Sep. 17, 2018

(65) Prior Publication Data

US 2019/0123346 A1 Apr. 25, 2019

(30) Foreign Application Priority Data

Oct. 20, 2017 (JP) .............................. JP2017-203483

(51) Int. Cl.
| | |
|---|---|
| *H01M 10/00* | (2006.01) |
| *H01M 4/36* | (2006.01) |
| *H01M 4/04* | (2006.01) |
| *H01M 4/60* | (2006.01) |
| *H01M 4/38* | (2006.01) |

(Continued)

(52) U.S. Cl.
CPC ............. *H01M 4/366* (2013.01); *H01G 11/32* (2013.01); *H01G 11/56* (2013.01); *H01G 11/68* (2013.01); *H01M 4/0404* (2013.01); *H01M 4/381* (2013.01); *H01M 4/587* (2013.01); *H01M 4/606* (2013.01); *H01M 4/661* (2013.01); *H01M 10/052* (2013.01); *H01M 10/054* (2013.01); *H01M 10/0564* (2013.01); *H01M 10/0585* (2013.01); *H01M 2300/0025* (2013.01); *H01M 2300/0065* (2013.01)

(58) Field of Classification Search
None
See application file for complete search history.

(56) References Cited

U.S. PATENT DOCUMENTS

2013/0280604 A1 10/2013 Ogihara et al.
2018/0277882 A1* 9/2018 Sugizaki ............. H01M 10/052

FOREIGN PATENT DOCUMENTS

JP 2008308421 A * 12/2008
JP 2013-225413 A 10/2013

OTHER PUBLICATIONS

Machine translation of JP2008308421A (Year: 2008).*
Dec. 10, 2019 Office Action issued in Japanese Patent Application No. 2017-203483.

* cited by examiner

*Primary Examiner* — Milton I Cano
*Assistant Examiner* — Mary G Henshaw
(74) *Attorney, Agent, or Firm* — Oliff PLC (57) ABSTRACT

The electrolyte according to the present disclosure is an electrolyte that conducts alkali metal ions and is used for producing an energy storage device. The electrolyte includes an organic crystal layer including a layered structure, the layered structure including an organic skeletal layer including aromatic dicarboxylic acid anions having an aromatic ring structure and an alkali metal element layer including an alkali metal element to which oxygen included in carboxylic acid anions of the organic skeletal layer are coordinated to form a skeleton, and an organic solvent charged in the organic crystal layer.

11 Claims, 8 Drawing Sheets

(51) Int. Cl.
*H01M 10/054* (2010.01)
*H01M 10/0564* (2010.01)
*H01M 10/052* (2010.01)
*H01G 11/56* (2013.01)
*H01G 11/68* (2013.01)
*H01M 10/0585* (2010.01)
*H01G 11/32* (2013.01)
*H01M 4/66* (2006.01)
*H01M 4/587* (2010.01)

ELECTROLYTE, ENERGY STORAGE DEVICE, AND METHOD FOR PRODUCING ENERGY STORAGE DEVICE

BACKGROUND OF THE INVENTION

1. Field of the Invention

The present specification discloses an electrolyte, an energy storage device, and a method for producing an energy storage device.

2. Description of the Related Art

There has been proposed an electrode active material for energy storage devices which includes a negative electrode active material that is a layered structure constituted by an organic skeletal layer including an aromatic compound that forms dicarboxylic acid anions having two or more aromatic ring structures and an alkali metal element layer including an alkali metal element to which oxygen included in carboxylic acid anions are coordinated to form a skeleton (e.g., see PTL 1). Setting the crystal plane interval of the above active material to be within a suitable range reduces, for example, the defects of the alkali metal element layer. This results in an increase in capacity density and improvement in the stability of charge-discharge cycles.

CITATION LIST

Patent Literature

PTL 4: Japanese Unexamined Patent Application Publication No. 2013-225413

SUMMARY OF THE INVENTION

The energy storage device disclosed in PTL 1 above includes a nonaqueous electrolyte solution produced by dissolving a supporting electrolyte, such as lithium hexafluorophosphate, in a nonaqueous solvent containing ethylene carbonate, dimethyl carbonate, and ethyl methyl carbonate. Such nonaqueous electrolyte solutions are required to have high inflammability and high chemical stability. In addition to electrolyte solutions, electrolytes having high inflammability, such as solid electrolytes, have also been studied. While various types of electrolytes have been studied as described above, there has been a demand for a novel electrolyte.

The present disclosure was made in light of the above issues. A primary object of the present disclosure is to provide a novel electrolyte that can be used for producing energy storage devices. Another object is to provide an energy storage device that includes the electrolyte and a method for producing the energy storage device.

The inventors of the present invention conducted extensive studies in order to achieve the above objects and, as a result, found that it becomes possible to conduct alkali metal ions when the crystal layer that includes the layered structure composed of an alkali metal salt of an aromatic dicarboxylic acid is filled with an organic solvent. Thus, the invention disclosed in the present specification was made.

Specifically, the electrolyte disclosed in the present specification is an electrolyte for energy storage devices, the electrolyte conducting alkali metal ions, the electrolyte including:

an organic crystal layer including a layered structure, the layered structure including an organic skeletal layer including aromatic dicarboxylic acid anions having an aromatic ring structure and an alkali metal element layer including an alkali metal element to which oxygen included in carboxylic acid anions of the organic skeletal layer are coordinated to form a skeleton; and an organic solvent charged in the organic crystal layer.

The energy storage device disclosed in the present specification is an energy storage device including:

a positive electrode including a positive electrode active material;

an negative electrode including a negative electrode active material; and the above-described electrolyte interposed between the positive electrode and the negative electrode, the electrolyte conducting alkali metal ions, the negative electrode active material having a higher action potential than the layered structure included in the electrolyte.

The method for producing an energy storage device disclosed in the present specification is a method for producing an energy storage device that uses alkali metal ions as a carrier, the method including:

a mixture-layer formation step in which a positive electrode mixture layer including a positive electrode active material is formed on a surface of a current collector capable of alloying with an alkali metal at a potential lower than a redox potential of a negative electrode active material, and a negative electrode mixture layer including the negative electrode active material is formed on another surface of the current collector;

a crystal-layer formation step in which an organic crystal layer including a layered structure, the layered structure including an organic skeletal layer including aromatic dicarboxylic acid anions having an aromatic ring structure and an alkali metal element layer including an alkali metal element to which oxygen included in carboxylic acid anions of the organic skeletal layer are coordinated to form a skeleton, is formed on a surface of the positive electrode mixture layer and/or on a surface of the negative electrode mixture layer;

a multilayer-body formation step in which a plurality of the current collectors including the organic crystal layer disposed thereon are stacked on top of one another to form a multilayer body; and a filling step in which the organic crystal layer is filled with an organic solvent.

The present disclosure provides a novel electrolyte that can be used for producing energy storage devices. Since the electrolyte includes a layered structure composed of an alkali metal salt of an aromatic dicarboxylic acid and an organic solvent, the mobility of alkali metal ions included in the alkali metal element layer constituting the layered structure is increased. This presumably enables the electrolyte to serve as an ion conductor. The electrolyte has ionic conductivity although no supporting electrolyte is dissolved in the organic solvent, because the solid layered structure serves as a supporting electrolyte. Therefore, the electrolyte may reduce the likelihood of short circuit (liquid junction) occurring through an organic solvent between, for example, bipolar electrodes included in an assembled battery that includes the electrolyte and, accordingly, enables energy storage devices to be produced in an easier and simpler process.

DESCRIPTION OF THE PREFERRED EMBODIMENTS (Electrolyte)

Figure 1:
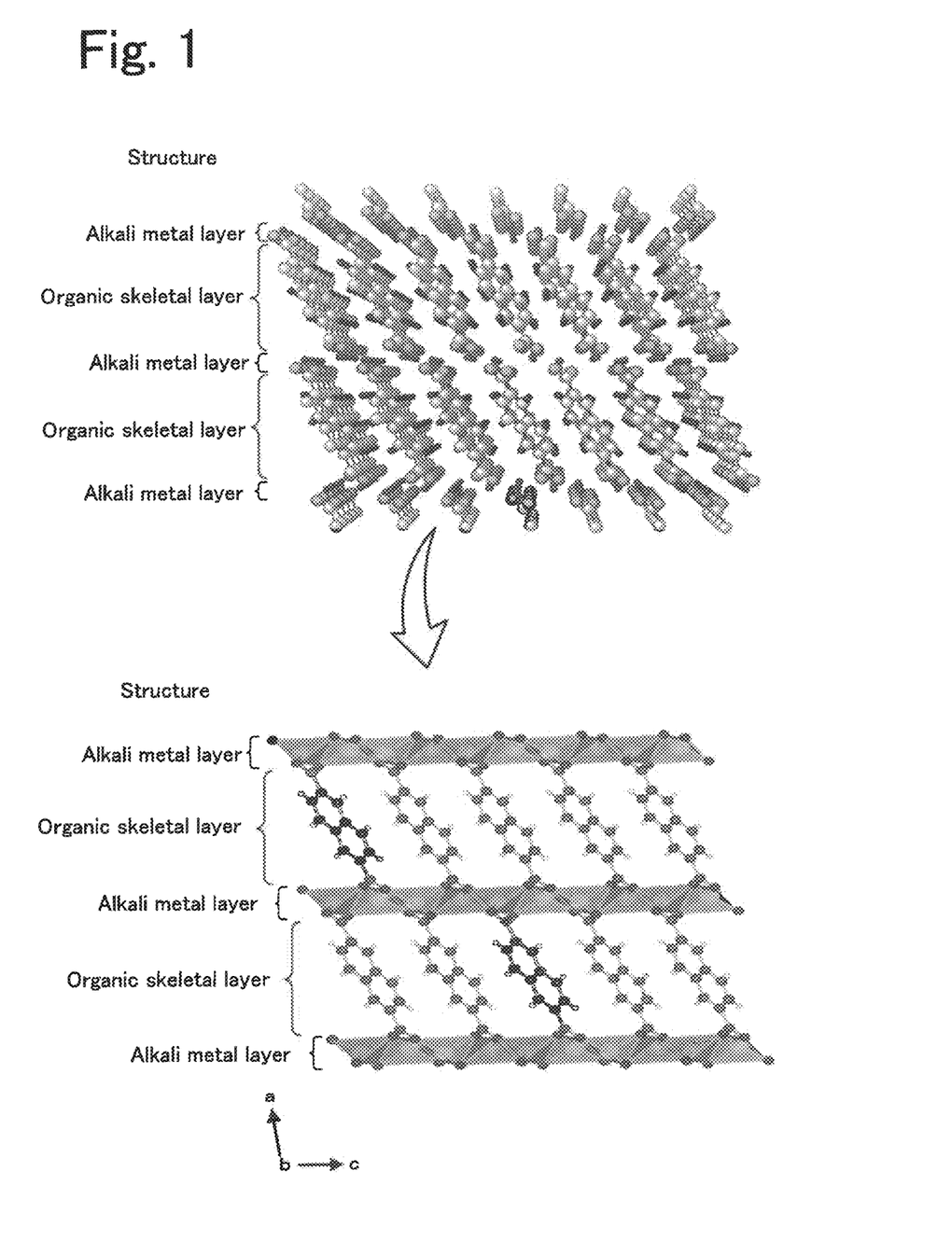
FIG. 1 is a diagram illustrating an example structure of a layered structure.

The electrolyte disclosed in the present specification is an electrolyte that conducts alkali metal ions that serve as a carrier in an energy storage device and is used for producing energy storage devices. The alkali metal ions used as a carrier may be one or more of Li ions, Na ions, and K ions. Hereinafter, Li is primarily described for the sake of simplicity. The electrolyte includes an organic crystal layer including a layered structure, the layered structure including an organic skeletal layer including aromatic dicarboxylic acid anions having an aromatic ring structure and an alkali metal layer including an alkali metal element to which oxygen included in carboxylic acid anions of the organic skeletal layer are coordinated to form a skeleton, and an organic solvent charged in the organic crystal layer. The aromatic dicarboxylic acid anions include at least one aromatic ring and may include one or more of a non-fused polycyclic structure that includes two or more aromatic rings bonded to one another and a fused polycyclic structure produced by condensation of two or more aromatic rings. Examples of the one aromatic ring include a benzene ring. Examples of the non-fused polycyclic structure include a biphenyl structure. Examples of the fused polycyclic structure include a naphthalene structure. FIG. 1 is a diagram illustrating an example structure of a layered structure. The example layered structure illustrated in FIG. 1 is composed of naphthalene dicarboxylate dilithium, in which the organic skeletal layer is composed of naphthalene and the alkali metal element layer is composed of lithium.

The layered structure may include an organic skeletal layer that includes one or two or more aromatic ring structures bonded to one another. The layered structure is preferably formed in a laminar manner due to the interaction between the π electrons of the aromatic compound and preferably has a monoclinic crystal structure that belongs to the space group $P2_1/c$ in order to increase structural stability. The organic skeletal layer included in the layered structure may be composed of a non-fused polycyclic compound that includes two or more aromatic rings bonded to one another, such as biphenyl, or a fused polycyclic compound produced by condensation of two or more aromatic rings, such as naphthalene, anthracene, or pyrene. The aromatic rings may be five-membered rings, six-membered rings, or eight-membered rings and are preferably six-membered rings. The number of the aromatic rings is preferably two to five. When the number of the aromatic rings is two or more, the layered structure may be readily formed. When the number of the aromatic rings is five or less, the energy density may be further increased. The organic skeletal layer may have a structure that includes an aromatic ring and two or more carboxyl acid anions bonded to the aromatic ring. The organic skeletal layer preferably includes an aromatic compound that includes an aromatic ring structure and two carboxylic acid anions such that the two carboxylic acid anions are bonded to the aromatic ring structure at diagonally opposite positions. The diagonally opposite positions at which the carboxylic acids are bonded to the aromatic ring structure may be considered to be positions such that the distance between the position at which one of the two carboxylic acids is bonded to the aromatic ring structure and the position at which the other carboxylic acid is bonded to the aromatic ring structure is maximized. For example, when the aromatic ring structure is naphthalene, the diagonally opposite positions shall be the 2- and 6-positions.

The layered structure may have a structure represented by one or more of Formulae (1) to (3). In Formulae (1) to (3), a represents an integer of 1 to 5, and b represents an integer of 0 to 3. The above aromatic compounds may include a substituent and a heteroatom in the structure. Specifically, the hydrogen atoms of the aromatic compounds may be replaced with a substituent such as a halogen atom, a chain or cyclic alkyl group, an aryl group, an alkenyl group, an alkoxy group, an aryloxy group, a sulfonyl group, an amino group, a cyano group, a carbonyl group, an acyl group, an amide group, or a hydroxyl group. In another case, the carbon atoms of the aromatic compounds may be replaced with a nitrogen atom, a sulfur atom, or an oxygen atom. More specifically, the layered structure may be selected from the aromatic compounds represented by Formulae (4) and (5). In Formulae (1) to (5), A represents an alkali metal. The layered structure preferably includes the structure represented by Formula (6) below, in which four oxygen atoms included in different dicarboxylic acid anions and an alkali metal element form a four-coordination bond, in order to enhance structural stability. In Formula (6), R represents one or two or more aromatic ring structures. Among the plurality of R's, two or more R's may represent the same aromatic ring structure as one another and one or more R's may represent an aromatic ring structure different from the others. In Formula (6), A represents an alkali metal. As described above, the layered structure preferably has a structure in which the organic skeletal layers are bonded to one another with the alkali metal element. Specific examples of the layered structure include an alkali metal salt of 4,4'-biphenyldicarboxylic acid, an alkali metal salt of 2,6-naphthalenedicarboxylic acid, and an alkali metal salt of terephthalic acid, as represented by Formulae (7) to (12). The layered structure may include one or more of the above compounds.

[Chem. 1]

Formula (1)

Formula (2)

Formula (3)

(a represents an integer of 1 to 5, b represents an integer of 0 to 3, and these aromatic compounds may have a substituent or a heteroatom in the molecular structure thereof. A represents an alkali metal.)

[Chem. 2]

Formula (4)

Formula (5)

(A represents an alkali metal)

[Chem. 3]

Formula (6)

R represents one or multiple aromatic ring structures, and two or more of the R's may be the same or one or more of the R's may be different from the others. A represents an alkali metal.

[Chem. 4]

Formula (7)

Formula (8)

Formula (9)

Formula (11)

Formula (12)

Examples of the alkali metal included in the alkali metal element layer include Li, Na, and K. These alkali metals may be used alone or in combination of two or more. The alkali metal is preferably Li. The alkali metal ion used as a carrier in an energy storage device is preferably the same as the alkali metal element included in the alkali metal element layer. The alkali metal element included in the alkali metal element layer is responsible for the formation of the skeleton of the layered structure and also used for conducting alkali metal ions. It is considered that the alkali metal ions included in the alkali metal element layer become capable of migrating through the structure without changing the structure when used in combination with a predetermined organic solvent.

The layered structure is solid and may be formed into the organic crystal layer by molding or the like. The organic crystal layer may be produced by, for example, adding optional components such as a binder to a powder of the layered structure and press-molding the resulting powder mixture. That is, the organic crystal layer may be one or more of a self-standing film and a self-standing plate-like body. Alternatively, the organic crystal layer may be formed by applying a composition onto an electrode mixture. That is, the organic crystal layer may be one or more of a film and a plate-like body that are provided with a support that is a current collector or an electrode mixture layer and held on the support. The thickness of the organic crystal layer is preferably, for example, 1 μm or more and 5 μm or less. Limiting the thickness of the organic crystal layer to be 1 μm or more advantageously further reduces the occurrence of, for example, short-circuit between the electrodes. Limiting the thickness of the organic crystal layer to be 5 μm or less advantageously enables rapid conduction of alkali metal ions. The ratio at which the organic crystal layer is packed with the layered structure is preferably 0.8 or more and is more preferably 0.85 or more by volume. The packing ratio of the layered structure is preferably 0.8 or more, because this ratio has a correlation with the abundance ratio of the alkali metal ions. The packing ratio is preferably 0.95 or less from the viewpoint of, for example, filling the organic crystal layer with the organic solvent. In other words, the porosity of the organic crystal layer is preferably 20% or less, is more preferably 15% or less, and is preferably 5% or more by volume.

The organic solvent is not limited and may be, for example, a polar aprotic solvent. The dielectric constant of the organic solvent is preferably 10 or more and is more preferably 20 or more. It is preferable to use an organic solvent having a high dielectric constant, which enables further sufficient conduction of the carrier. It is more preferable that the organic solvent have a high boiling point. The boiling point of the organic solvent is preferably, for example, 150° C. or more. The organic solvent is preferably one or more of, for example, dimethyl sulfoxide, dimethylformamide, and propylene carbonate. The organic solvent does not necessarily include a supporting electrolyte, such as $LiPF_6$ or $LiBF_4$, because the layered structure serves as a supporting electrolyte.

Figure 2:
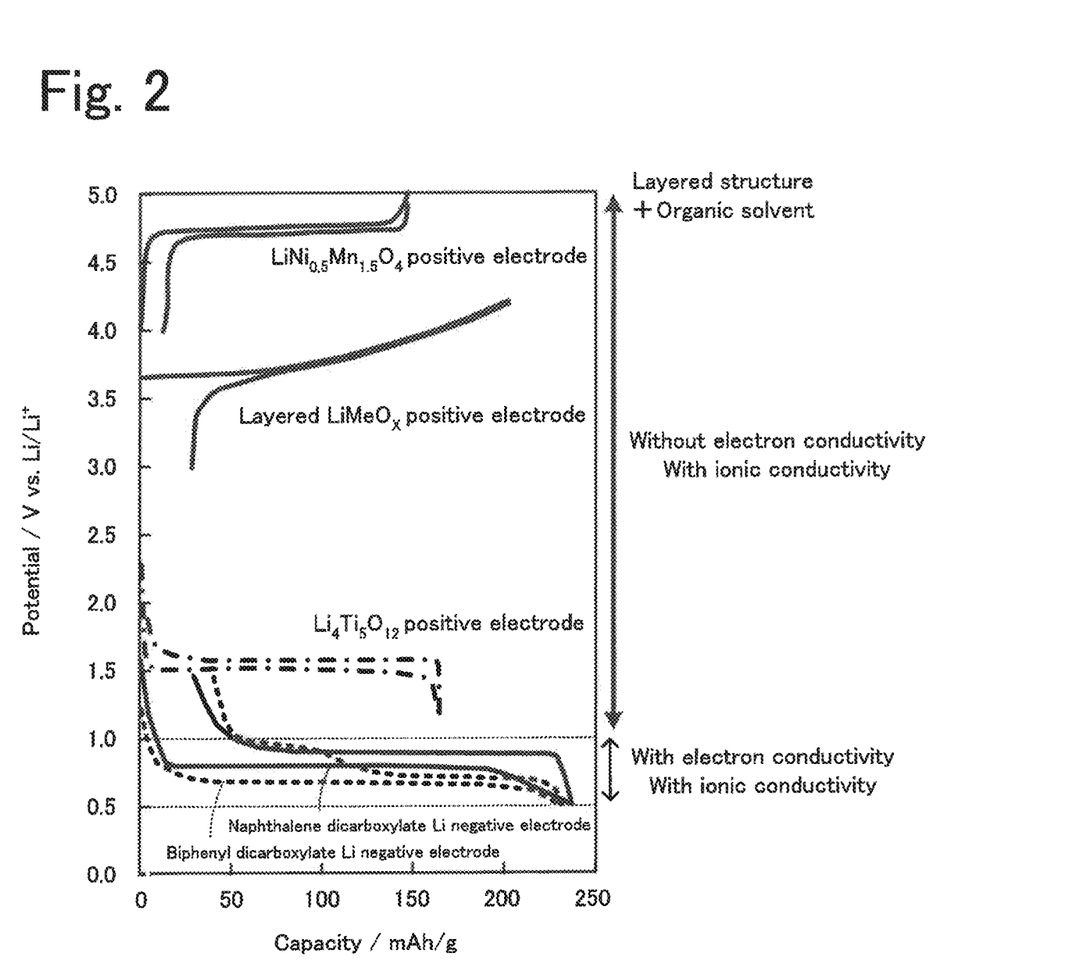
FIG. 2 is a diagram illustrating the relationship between the action potentials of layered structures, positive electrode active materials, and a negative electrode active material.

The above layered structure is capable of occluding and releasing alkali metal ions in a predetermined potential range. In the case where the layered structure is used as an electrolyte, it is preferably used for producing an energy storage device operated in a potential range that deviates from the predetermined potential range. FIG. 2 is a diagram illustrating the relationship between the single-electrode action potentials of layered structures, positive electrode active materials, and a negative electrode active material. In FIG. 2, $LiNi_{0.5}Mn_{1.5}O_4$ and layered $LiMeO_X$ (e.g., Me is one or more of Co, Ni, and Mn, and X=2) are shown as examples of positive electrode active materials, $Li_4Ti_5O_{12}$ is shown as an example of negative electrode active materials, and naphthalene dicarboxylate dilithium and biphenyl dicarboxylate dilithium are shown as examples of layered structures. The layered structure occludes and releases alkali metal (lithium) ions in the potential range of 0.5 V or more and 1.0 V or less with respect to lithium. In the potential range of more than 1.0 V with respect to lithium, on the other hand, the layered structure has ionic conductivity due to the presence of the organic solvent but not electron conductivity and acts as, for example, a solid electrolyte. Accordingly, it is considered that the above electrolyte can be used for producing energy storage devices when used in combination with a negative electrode active material such that the potential of the negative electrode is more than 1.0 V and is more preferably 1.2 V or more with respect to lithium.

(Energy Storage Device)

The energy storage device disclosed in the present specification may include a positive electrode that includes a positive electrode active material, a negative electrode that includes a negative electrode active material, and the above-described electrolyte interposed between the positive and negative electrodes which conducts alkali metal ions. The positive electrode may include a positive electrode active material capable of occluding and releasing alkali metal ions that serve as a carrier. The negative electrode may include a negative electrode active material capable of occluding and releasing alkali metal ions that serve as a carrier. The energy storage device may be used as an electric double-layer capacitor, a hybrid capacitor, an electric double-layer pseudocapacitor, a lithium ion battery, or the like. In the above energy storage device, the negative electrode active material may have an action potential higher than the action potential of the layered structure included in the electrolyte during charge and discharge (see FIG. 2). A negative electrode active material having such a potential may further reduce the risk of the layered structure becoming reduced to have electron conductivity.

The positive electrode of the energy storage device according to the present disclosure may be formed by, for example, mixing a positive electrode active material with a conductant agent and a binder, adding an appropriate solvent to the resulting mixture to prepare a pasty positive electrode mixture, applying the positive electrode mixture onto the surface of a current collector, drying the resulting layer, and compressing the layer as needed in order to increase electrode density. Examples of the positive electrode active material include a sulfide that contains a transition metal element and an oxide that contains lithium and a transition metal element. Specific examples thereof include transition metal sulfides, such as $TiS_2$, $TiS_3$, $MoS_3$, and $FeS_2$; lithium-manganese composite oxides represented by the basic composition formula $Li_{(1-x)}MnO_2$ (e.g., $0 \leq x \leq 1$, the same applies hereinafter), $Li_{(1-x)}Mn_2O_4$, or the like; lithium-cobalt composite oxides represented by the basic composition formula $Li_{(1-x)}CoO_2$ or the like; lithium-nickel composite oxides represented by the basic composition formula $Li_{(1-x)}NiO_2$ or the like; lithium-nickel-cobalt-manganese composite oxides represented by the basic composition formula $Li_{(1-x)}Ni_a Co_b Mn_c O_2$ ($a+b+c=1$) or the like; lithium-vanadium composite oxides represented by the basic composition formula $LiV_2O_3$ or the like; and transition metal oxides represented by the basic composition formula $V_2O_5$ or the like. Among the above positive electrode active materials, lithium-transition metal composite oxides, such as $LiCoO_2$, $LiNiO_2$, $LiMnO_2$, and $LiV_2O_3$, are preferable. The term "basic composition formula" used herein means that the positive electrode active materials may include other elements such as Al and Mg.

The conductant agent included in the positive electrode may be any electron-conducting material that does not adversely affect the cell performance of the positive electrode. Examples of the conductant agent include graphite, such as natural graphite (flake graphite and scale-like graphite) or artificial graphite, acetylene black, carbon black, Ketjenblack, carbon whisker, needle coke, carbon fibers, a metal (e.g., copper, nickel, aluminum, silver, or gold). The above conductant agents may be used alone or in a mixture of two or more. Among the above conductant agents, carbon black and acetylene black are preferable from the aspect of electron conductivity and ease of application. The binder is a component that binds particles of the active material and particles of the conductant agent to one another. Examples of the binder include a fluorine-containing resin, such as polytetrafluoroethylene (PTFE), polyvinylidene fluoride (PVDF), or a fluorine rubber; a thermoplastic resin, such as polypropylene or polyethylene; an ethylene propylene diene monomer (EPDM) rubber; a sulfonated EPDM rubber; and a natural butyl rubber (NBR). The above binders may be used alone or in a mixture of two or more. Aqueous binders such as water dispersion of cellulose or a styrene butadiene rubber (SBR) may also be used. Examples of a solvent in which the positive electrode active material, the conductant agent, and the binder are dispersed include the following organic solvents: N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. It is also possible to form a latex of SBR or the like by adding a dispersing agent, a thickener, and the like to water in order to produce a slurry of the active material. Examples of the thickener include polysaccharides, such as carboxymethyl cellulose and methyl cellulose. The above thickeners may be used alone or in a mixture of two or more. For applying the above electrode mixture to the current collector, the following methods may be used: roller coating using an applicator roller, screen coating, doctor blading, spin coating, and bar coating. The thickness and shape of the positive electrode can be adjusted to be the desired thickness and shape using any of the above methods. The current collector may be composed of aluminum, titanium, stainless steel, nickel, iron, baked carbon, a conductive high-molecular compound, or conductive glass. A current collector composed of aluminum, copper, or the like the surface of which has been treated with carbon, nickel, titanium, silver, or the like in order to enhance adhesion, conductivity and oxidation resistance may also be used. The surface of the above current collector may optionally be treated by oxidation. As for the shape of the current collector, the current collector may be, for example, foil-like, film-like, sheet-like, net-like, punched, or expanded. The current collector may be a lath body, a porous body, a foam, a fiber bundle, or the like. The thickness of the current collector is, for example, 1 to 500 μm.

The negative electrode of the energy storage device according to the present disclosure may be formed such that the negative electrode active material and the current collector are brought into intimate contact with each other or may be formed by, for example, mixing a negative electrode active material with a conductant agent and a binder, adding an appropriate solvent to the resulting mixture to prepare a pasty negative electrode mixture, applying the negative electrode mixture onto the surface of a current collector, drying the resulting layer, and compressing the layer as needed in order to increase electrode density. The charge-discharge potential of the negative electrode is preferably more than 1.0 V and is more preferably 1.2 V or more with respect to lithium. Examples of the negative electrode active material include an oxide of a metal such as a transition element and a composite oxide that contains a transition element. Examples of the metal oxide include $Nb_2O_5$, $NbO_2$, and $RuO_2$. The above metal oxides may be used alone or in combination of two or more. Examples of the composite oxide include a lithium-titanium composite oxide and a lithium-vanadium composite oxide. Among the above negative electrode active materials, a lithium-titanium composite oxide is preferable from the aspect of chemical stability. The conductant agent, the binder, the solvent, etc. used for forming the negative electrode may be selected from the above examples of the conductant agent, the binder, and the solvent used for forming the positive electrode, respectively. The current collector of the negative electrode may be composed of copper, nickel, stainless steel, titanium, aluminum, baked carbon, a conductive high-molecular compound, conductive glass, or an Al—Cd alloy. A current collector composed of copper or the like the surface of which has been treated with carbon, nickel, titanium, or silver in order to enhance adhesion, conductivity and reduction resistance may also be used. The surface of the above current collector may optionally be treated by oxidation. The shape of the current collector may be selected from the examples of the shape of the positive electrode.

The energy storage device includes the above-described electrolyte interposed between the positive and negative electrodes. The energy storage device may further include, in addition to the electrolyte, a separator also interposed between the positive and negative electrodes. The separator may be any separator having a composition capable of withstanding the environment in which the energy storage device is used. Examples of the separator include polymer nonwoven fabrics, such as a polypropylene nonwoven fabric and a polyphenylene sulfide nonwoven fabric; and microporous membranes composed of olefin resins, such as polyethylene and polypropylene. The above separators may be used alone or in combination of two or more.

Figure 3:
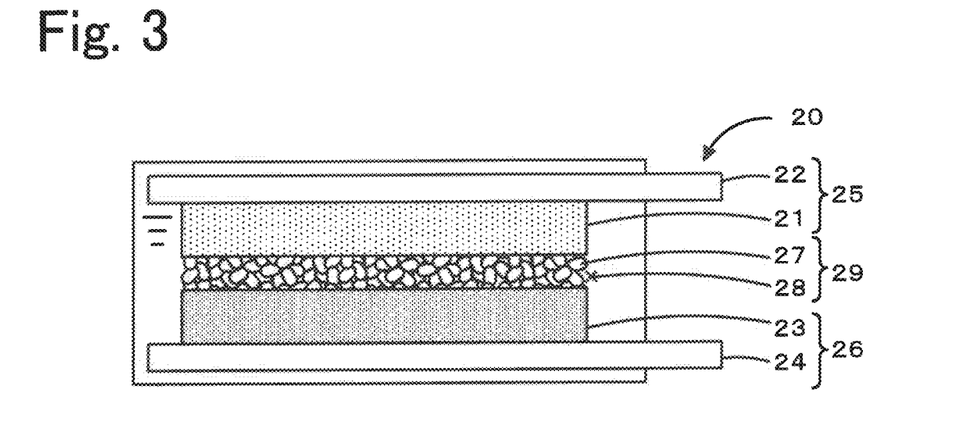
FIG. 3 is a schematic diagram illustrating an example of an energy storage device 20.

Examples of the shape of the energy storage device include, but are not limited to, a coin-like shape, a button-like shape, a sheet-like shape, a multilayer shape, a cylindrical shape, a flat shape, and a rectangular shape. The energy storage device may be a large energy storage device included in an electric vehicle or the like. FIG. 3 is a schematic diagram illustrating an example of an energy storage device 20. The energy storage device 20 includes a positive electrode 25, a negative electrode 26, and an electrolyte 29. The positive electrode 25, the negative electrode 26, and the electrolyte 29 are accommodated in a cell casing. The positive electrode 25 includes a positive electrode mixture layer 21 that includes a positive electrode active material and a positive electrode current collector 22 on which the positive electrode mixture layer 21 is disposed. The negative electrode 26 is constituted by a negative electrode mixture layer 23 that includes a negative electrode active material and a negative electrode current collector 24. The electrolyte 29 is interposed between the positive electrode 25 and the negative electrode 26 and conducts alkali metal ions. The electrolyte 29 is constituted by an organic crystal layer 27 that includes a layered structure composed of an alkali metal salt of an aromatic dicarboxylic acid and an organic solvent 28 charged in the gaps formed in the organic crystal layer 27.

Figure 4:
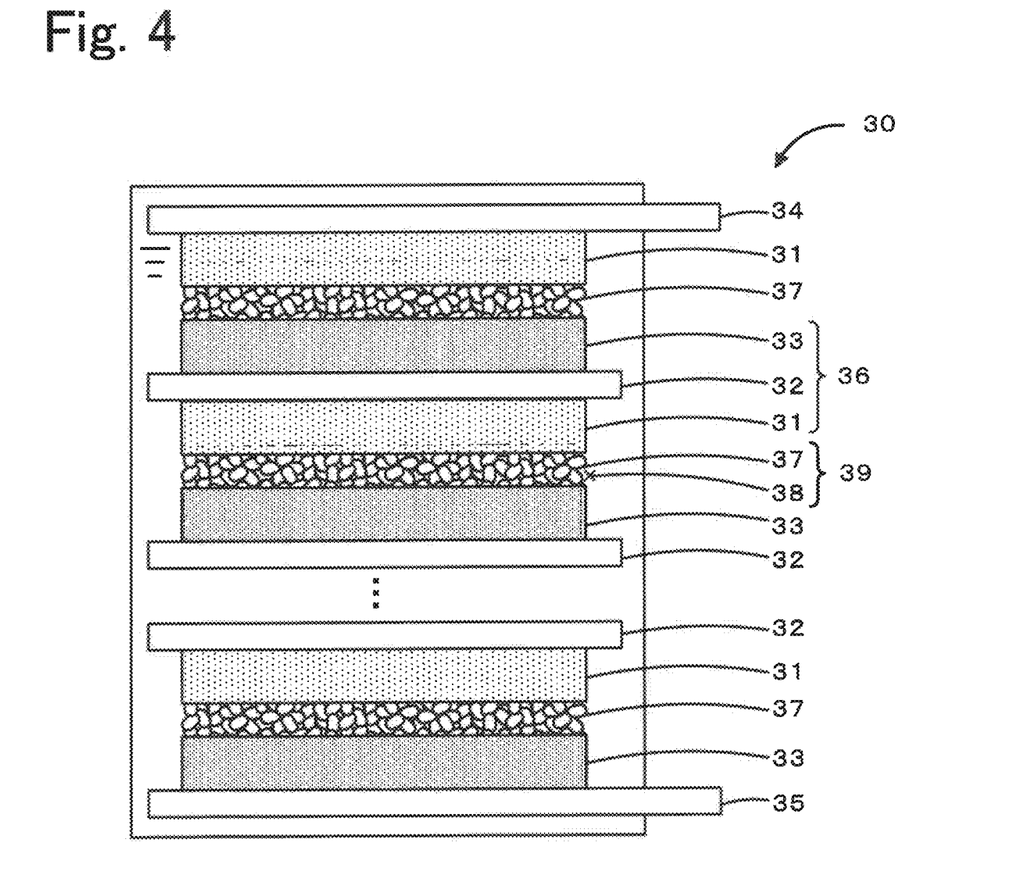
FIG. 4 is a schematic diagram illustrating an example of an assembled battery 30 that includes a plurality of bipolar electrodes 36 stacked on top of one another.

The energy storage device may be an assembled battery 30 that includes bipolar electrodes 36 stacked on top of one another. FIG. 4 is a schematic diagram illustrating an example of the assembled battery 30 that includes a plurality of bipolar electrodes 36 stacked on top of one another. The assembled battery 30 is constituted by bipolar electrodes 36 each of which includes a current collector 32, a positive electrode mixture layer 31 that is disposed on a surface of the current collector 32 and includes a positive electrode active material, and a negative electrode mixture layer 33 that is disposed the other surface of the current collector 32 and includes a negative electrode active material and by an electrolyte 39 interposed between the positive electrode mixture layer 31 and the negative electrode mixture layer 33 of an adjacent current collector 32. That is, the assembled battery 30 includes a plurality of the bipolar electrodes 36 stacked on top of one another with the electrolyte 39 being interposed between each adjacent two of the bipolar electrodes 36. The positive-electrode end of the assembled battery 30, in which the positive electrode mixture layer 31, the negative electrode mixture layer 33, and the organic crystal layer 37 are stacked, is provided with a positive electrode collector terminal 34 disposed thereon. The negative-electrode end of the assembled battery 30 is provided with a negative electrode collector terminal 35 disposed thereon. The positive electrode mixture layer 31, the negative electrode mixture layer 33, the organic crystal layer 37, and the electrolyte 39 may be the positive electrode mixture layer, the negative electrode mixture layer, the organic crystal layer, and the electrolyte described above. The current collector 32 may be composed of a metal capable of alloying with an alkali metal at a potential lower than the redox potential of the negative electrode active material. The current collector 32 may have an elution potential higher than the redox potential of the positive electrode active material. The current collector 32 may be any current collector that is stable chemically and thermally at the action potentials and the operating temperatures of the positive and negative electrode active materials. Examples of a material for the current collector 32 include a noble metal, aluminum, an aluminum alloy. Among the above materials, a metal containing aluminum is preferable. For example, aluminum is used as a material for a positive electrode current collector because it is stable at a typical charge-discharge potential of the positive electrode. The alloying reaction of aluminum with lithium occurs at 0.27 V with respect to lithium metal. Therefore, aluminum can be used as a material for a negative electrode that undergoes a charge-discharge reaction at a potential more than 1.0 V with respect to lithium. Accordingly, aluminum metal may be used as a material for a current collector on which the positive or negative electrode mixture layer is formed. The assembled battery 30 eliminates the need to use different materials for preparing the positive and negative electrode current collectors and further reduces the complexity of material procurement and production steps, such as individual production of positive and negative electrodes. In addition, the volume of the energy storage device which is constituted by the current collector can be reduced.

(Method for Producing Energy Storage Device)

Figure 5A:
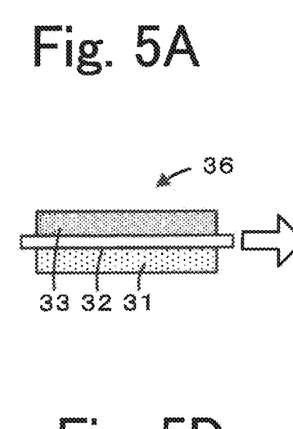
FIGS. 5A to 5E include diagrams illustrating an example process for producing an assembled battery 30.
Figure 5B:
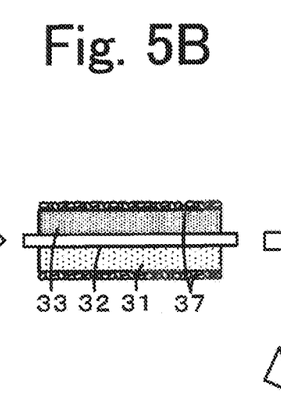
Figure 5C:
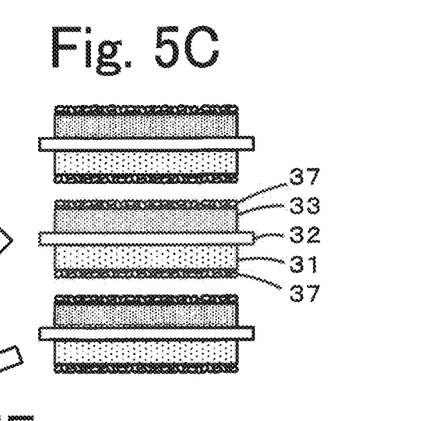
Figure 5D:
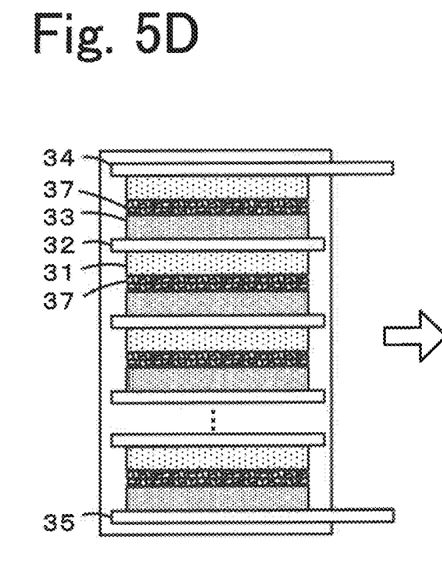
Figure 5E:
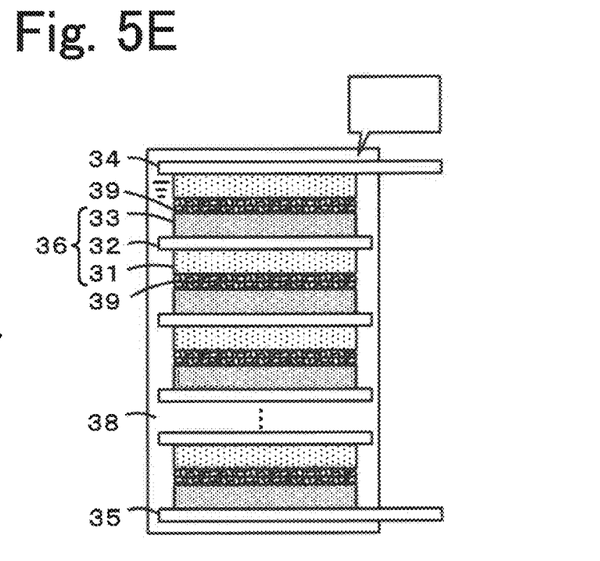

The method for producing the energy storage device according to the present disclosure is a method for producing an assembled battery 30 in which alkali metal ions are used as a carrier. The method for producing the energy storage device may include, for example, a mixture-layer formation step, a crystal-layer formation step, a multilayer-body formation step, and a filling step. FIG. 5 includes diagrams illustrating an example of the process for producing the assembled battery 30. FIGS. 5A to 5E are a diagram illustrating the mixture-layer formation step. FIG. 5B is a diagram illustrating the crystal-layer formation step. FIGS. 5C and 5D are diagrams illustrating the multilayer-body formation step. FIG. 5E is a diagram illustrating the filling step. One or more of the above steps may be omitted. That is, the mixture-layer formation step may be omitted by preparing a current collector on which mixture layers have been formed. The filling step may be omitted by conducting the step in which the layered structure is packed with the organic solvent in another division.

(Mixture-Layer Formation Step)

In this step, a positive electrode mixture layer 31 that includes a positive electrode active material is formed on one of the surfaces of a current collector 32 and a negative electrode mixture layer 33 that includes a negative electrode active material is formed on the other surface of the current collector 32 in order to prepare a bipolar electrode 36 (FIGS. 5A to 5E). The materials for the positive electrode mixture layer 31 and the negative electrode mixture layer 33 may be selected appropriately from those described above in Energy Storage Device. The current collector 32 is preferably composed of aluminum or an aluminum alloy, as described above. The thickness of the current collector 32 is, for example, 1 to 50 µm. The thicknesses of the positive electrode mixture layer 31 and the negative electrode mixture layer 33 are set adequately in accordance with the application and capacity of the energy storage device and may be set to 1 to 50 µm. The positive electrode mixture layer 31 and the current collector 32 can be formed by, for example, roller coating using an applicator roller, screen coating, doctor blading, spin coating, or bar coating.

(Crystal-Layer Formation Step)

In this step, an organic crystal layer 37 that includes the above-described layered structure is formed on the surfaces of the positive electrode mixture layer 31 and/or the negative electrode mixture layer 33 (FIG. 5B). In this step, the organic crystal layer 37 may be formed on the surfaces of both positive electrode mixture layer 31 and negative electrode mixture layer 33. Alternatively, the organic crystal layer 37 may be formed on any one of the positive electrode mixture layer 31 and the negative electrode mixture layer 33. It is preferable to form the organic crystal layer 37 on the surfaces of both positive electrode mixture layer 31 and negative electrode mixture layer 33 in order to form suitable interface between the mixture layer and the organic crystal layer. The layered structure included in a portion of the organic crystal layer 37 which is other than the alkali metal element layer preferably does not include an alkali metal. The layered structure included in the organic crystal layer 37 is preferably not conductive. Since the layered structure composed of an alkali metal salt of an aromatic dicarboxylic acid is an insulating substance, a layered structure that does not occlude an alkali metal and is not conductive is hard to occlude and release alkali metal ions and serve as an active material and, therefore, preferably used as a material for the electrolyte. The organic crystal layer may be formed on the surface of the mixture layer by coating or pressing. The thickness of the organic crystal layer is set adequately in accordance with the application and capacity of the energy storage device and may be, for example, 5 µm or more and 50 µm or less. Note that, in the case where the organic crystal layer 37 is formed on the surfaces of the positive electrode mixture layer 31 and the negative electrode mixture layer 33 as illustrated in FIG. 5B, the thickness of the organic crystal layer 37 is adjusted accordingly since the thickness of the organic crystal layer 37 doubles in the subsequent multilayer-body formation step. The ratio at which the organic crystal layer 37 formed in this step is packed with the layered structure is preferably 0.8 or more and is more preferably 0.85 or more by volume. The organic crystal layer 37 may include a binder. The amount of the binder added to the organic crystal layer 37 is preferably, for example, 0.5% by mass or more and 5% by mass or less of the amount of the layered structure. The binder described in Energy Storage Device may be used as needed.

(Multilayer-Body Formation Step)

In this step, a plurality of the bipolar electrodes 36 that include the organic crystal layers 37 disposed thereon are stacked on top of one another to form a multilayer body (FIG. 5C). In this step, furthermore, a positive electrode collector terminal 34 is formed on an end of the multilayer body in which the positive electrode mixture layer 31 is disposed, and a negative electrode collector terminal 35 is formed on the other end of the multilayer body in which the negative electrode mixture layer 33 is disposed. The resulting multilayer body is charged into a cell casing (FIG. 5D).

(Filling Step)

In this step, the organic crystal layer 37 is filled with an organic solvent 38 to form an electrolyte 39 and, hereby, an assembled battery 30 (energy storage device) is formed. In this step, the cell casing that contains the multilayer is filled with the organic solvent 38. The organic solvent 38 may be the organic solvent described in Energy Storage Device above. The organic solvent does not necessarily include a supporting electrolyte. Using an organic solvent 38 that does not include a supporting electrolyte prevents the occurrence of short circuit (liquid junction) between a plurality of the bipolar electrodes 36 through the electrolyte solution. By this production method, the energy storage device can be produced by stacking a plurality of the bipolar electrodes 36 with the organic crystal layer 37 being interposed between each adjacent two of the bipolar electrodes 36 and injecting the organic solvent 38 to the resulting multilayer body. This enables the plurality of components of the energy storage device to be connected with one another with efficiency.

According to the electrolyte, the energy storage device, and the method for producing the energy storage device described above in detail, a novel electrolyte that includes a layered structure composed of an alkali metal salt of an aromatic dicarboxylic acid can be provided. Since the electrolyte includes a layered structure composed of an alkali metal salt of an aromatic dicarboxylic acid and an organic solvent, the mobility of alkali metal ions included in the alkali metal element layer constituting the layered structure is increased. This presumably enables the electrolyte to serve as an ion conductor. The electrolyte has ionic conductivity although no supporting electrolyte is dissolved in the organic solvent, because the solid layered structure serves as a supporting electrolyte. Therefore, the electrolyte may reduce the likelihood of short circuit (liquid junction) occurring through an organic solvent between, for example, bipolar electrodes included in an assembled battery that includes the electrolyte and, accordingly, enables energy storage devices to be produced in an easier and simpler process.

It is needless to say that the present disclosure is not limited by the above-described embodiment. Various aspects of the present disclosure may be implemented within the technical scope of the present disclosure.

EXAMPLES

Example cases where the electrolyte and the energy storage device were specifically implemented are described below as Examples. Needless to say that the present disclosure is not limited to Examples below and various aspects of the present disclosure may be implemented within the technical scope of the present disclosure.

(Synthesis of Layered Structure Having Fused Polycyclic Structure)

As starting materials, 2,6-naphthalenedicarboxylic acid and lithium hydroxide monohydrate (LiOH.H$_2$O) were used. First, methanol was added to lithium hydroxide monohydrate, and the resulting mixture was stirred. After the lithium hydroxide monohydrate had been dissolved in the methanol, 2,6-naphthalenedicarboxylic acid was added to the solution, which was subsequently stirred for one hour. After stirring, the solvent was removed and drying was performed under vacuum at 150° C. for 16 hours. Hereby, a white powder sample, that is, 2,6-naphthalene dicarboxylate dilithium (also referred to as "Naph powder"), was prepared. The Naph powder was subjected to powder X-ray diffraction analysis. The analysis was conducted with an X-ray diffractometer (RINT2200 produced by Rigaku Corporation) using CuKα radiation (wavelength: 1.54051 Å). The results of the analysis of the powder showed clear (001), (111), (102), and (112) peaks when it was assumed that the powder have a monoclinic system belonging to the space group P2$_1$/c. Accordingly, it was considered that a layered structure constituted by lithium layers and organic skeletal layers was formed. Since the powder had a monoclinic system belonging to the space group P2$_1$/c, it was considered that four oxygen atoms included in different aromatic dicarboxylic acid molecules and a lithium atom formed a four-coordination bond, and interaction due to the π-electron conjugated cloud acted in the organic skeletal portion.

(Synthesis of Layered Structure Having Non-Fused Polycyclic Structure)

As starting materials, 4,4'-biphenyldicarboxylic acid and lithium hydroxide monohydrate (LiOH.H$_2$O) were used. First, methanol was added to lithium hydroxide monohydrate, and the resulting mixture was stirred. After the lithium hydroxide monohydrate had been dissolved in the methanol, 4,4'-biphenyldicarboxylic acid was added to the solution, which was then stirred for one hour. After stirring, the solvent was removed and drying was performed under vacuum at 150° C. for 16 hours. Hereby, a white powder sample, that is, 4,4'-biphenyl dicarboxylate dilithium (also referred to as "Bph powder"), was prepared. The Bph powder was subjected to powder X-ray diffraction analysis. The results of the analysis were similar to those of the analysis of the Naph powder.

(Preparation of Test Cell)

Figure 6:
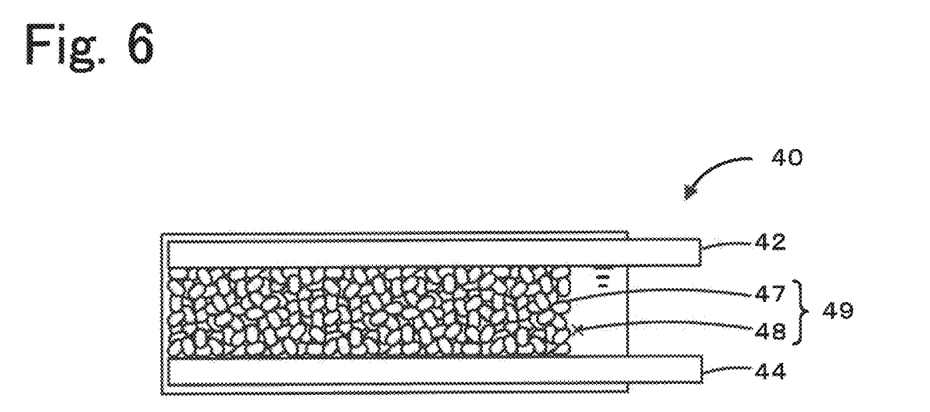
FIG. 6 is a diagram illustrating a test cell 40.

The Naph powder was mixed with carboxymethyl cellulose used as a binder such that the mass ratio between the Naph powder and the binder was 98:2. An adequate amount of water used as a dispersing agent was added to the resulting mixture. Subsequently, the mixture was dispersed to form a slurry. The slurry was uniformly applied to a current collector that was a copper foil having a thickness of 10 μm. The resulting coating film was dried by heating at 120° C. under vacuum. Hereby, a coated sheet that included an organic crystal layer formed thereon using the Naph powder was prepared. The packing ratio of the organic crystal layer included in the coated sheet was 86% by volume. Dimethyl sulfoxide (DMSO) used as an organic solvent was added to the coated sheet on the organic-crystal-layer side, and a current collector that was a copper foil was disposed on the counter side. Hereby, a test cell that included a current collector, an electrolyte, and a current collector that were arranged in this order was prepared. FIG. 6 is a diagram illustrating a test cell 40. The test cell 40 is constituted by a current collector 42, a current collector 44, and an electrolyte 49 interposed between the current collectors 42 and 44. The electrolyte 49 is constituted by an organic crystal layer 47 and an organic solvent 48 charged in the organic crystal layer 47.

Examples 1 and 2

An electrolyte constituted by an organic crystal layer that included a layered structure composed of the Naph powder and an organic solvent that was dimethyl sulfoxide (DMSO) was used in Example 1. An electrolyte constituted by an organic crystal layer that included a layered structure composed of the Naph powder and an organic solvent that was propylene carbonate (PC) was used in Example 2.

Comparative Examples 1 and 2

An electrolyte prepared as in Example 1, except that the addition of the organic solvent was omitted, was used in Comparative example 1. A cellulose porous nonwoven fabric (produced by Nippon Kodoshi Corporation) impregnated with dimethyl sulfoxide was used in Comparative example 2.

Comparative Example 3

An electrolyte prepared as in Example 1, except that the Naph powder was subjected to a Li-occlusion treatment using the following Li-predoping solution, was used in Comparative example 3.

(Li-Predope Treatment)

The Li-predoping solution was prepared as follows. Naphthalene was dissolved in tetrahydrofuran (THF) such that the concentration of naphthalene was 0.1 mol/L. Subsequently, an amount of metal lithium equivalent to 0.1 mol/L was added to the solution, which was then stirred in order to induce the reaction represented by Formula (13) below. Hereby, a dark green Li-predoping solution was prepared. A current collector that included an organic crystal layer formed thereon using the Naph powder was immersed in the Li-predoping solution over a night and then removed from the Li-predoping solution. The treated current collector was cleaned with THF and dried. Through the above treatment, Naph was reduced as illustrated by Formula (14), and Li ions were occluded into Naph due to charge compensation. In this state, the Naph powder is capable of giving and receiving electrons and Li ions as illustrated by Formula (15) below and can be used as an electrode active material. Since the layered structure composed of an alkali metal salt of an aromatic dicarboxylic acid is normally an insulating body, it is not possible to achieve the occlusion of Li ions in charge-discharge treatment without imparting conductivity by performing carbon coating or the like. On the other hand, the use of the Li-predoping solution enables the layered structure to be intercalated with Li ions although the layered structure remains as an insulating body.

[Chem. 5]

Formula (13)

-continued

Formula (14)

Formula (15)

(Evaluations of Electric Characteristics)

The electric characteristics of the test cells were determined by measuring alternating current impedance. Each of the test cells prepared above was measured with an AC impedance analyzer (Agilent 4294A) at an open-circuit voltage and an amplitude of ±500 mV within the frequency range of 1 Hz to 100 kHz and a temperature range of −30° C. to +60° C. The ionic conductivity (S/cm) of each of the test cells was calculated from the resistance between the current collectors.

(Results and Discussions)

Figure 7:
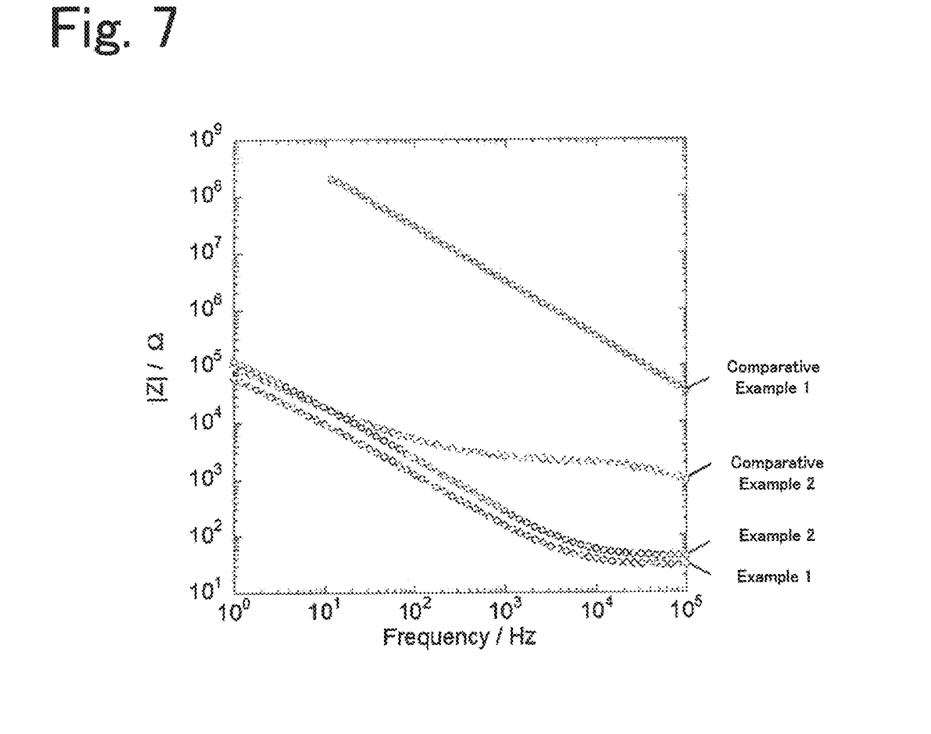
FIG. 7 is a diagram illustrating the relationships between resistance and frequency determined in Examples 1 and 2 and Comparative examples 1 and 2.
Figure 8:
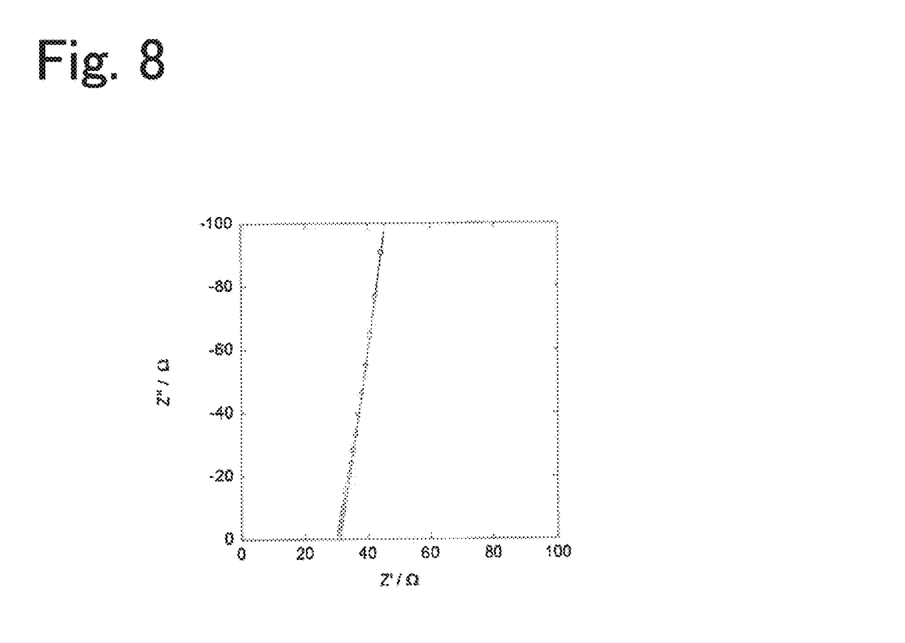
FIG. 8 illustrates a change in impedance measured in Example 1.
Figure 9:
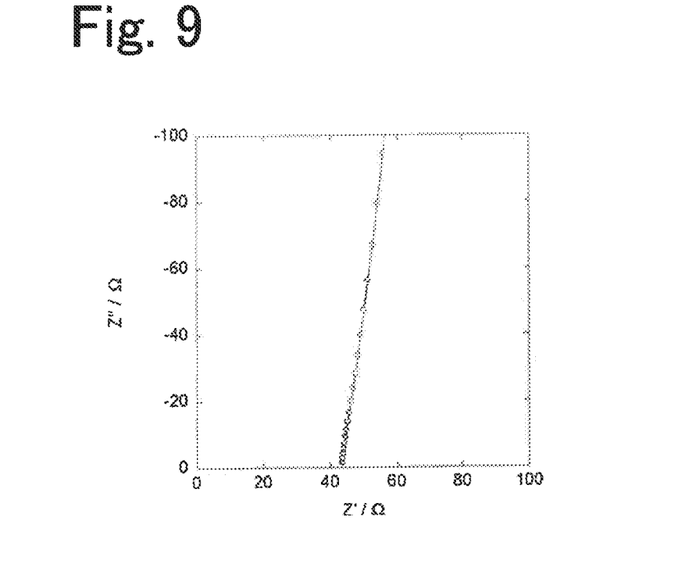
FIG. 9 illustrates a change in impedance measured in Example 2.
Figure 10:
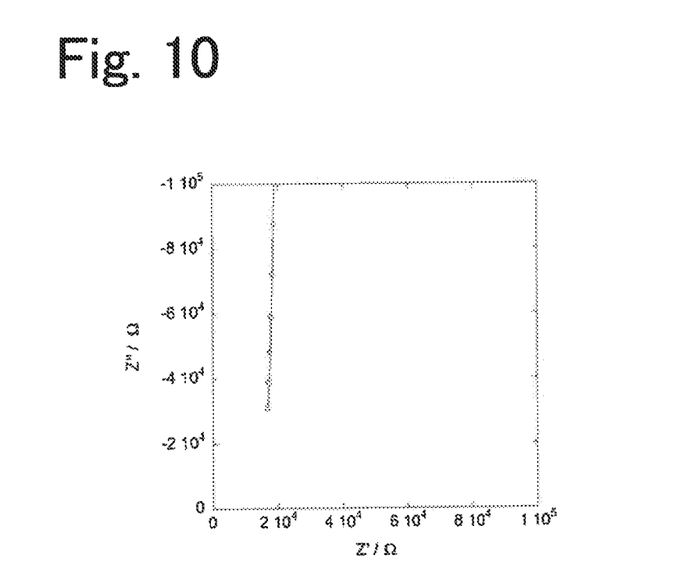
FIG. 10 illustrates a change in impedance measured in Comparative example 1.
Figure 11:
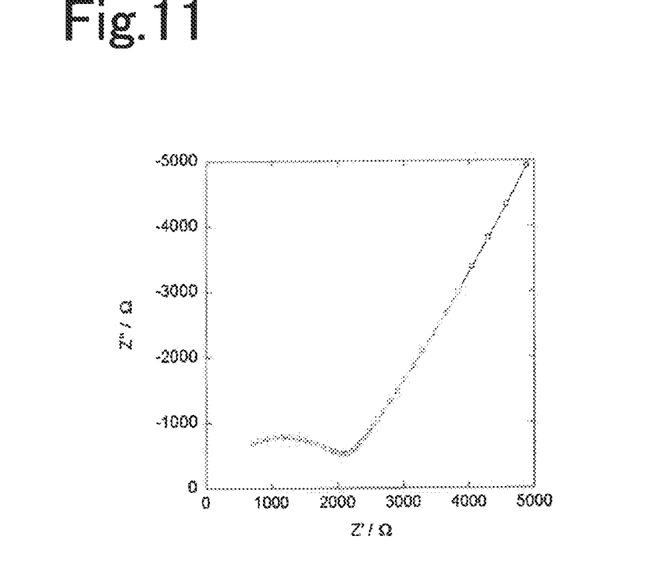
FIG. 11 illustrates a change in impedance measured in Comparative example 2.
Figure 12:
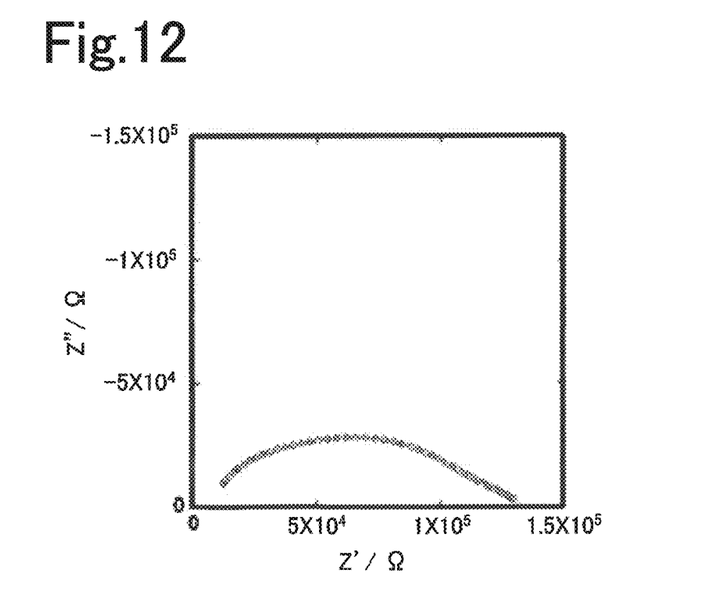
FIG. 12 illustrates a change in impedance measured in Comparative example 3.

FIG. 7 illustrates the relationships between resistance and frequency determined in Examples 1 and 2 and Comparative examples 1 and 2. FIG. 8 illustrates a change in impedance measured in Example 1. FIG. 9 illustrates a change in impedance measured in Example 2. FIG. 10 illustrates a change in impedance measured in Comparative example 1. FIG. 11 illustrates a change in impedance measured in Comparative example 2. FIG. 12 illustrates a change in impedance measured in Comparative example 3. As illustrated in FIG. 7, the resistance values of the test cells prepared in Comparative examples 1 and 2 at high frequencies ($10^5$ Hz), which have a correlation with ionic conductivity, were high. In contrast, the test cells prepared in Examples 1 and 2 had a low resistance value of $10^2 \Omega$ or less and are considered to have high ionic conductivity. The results illustrated in FIGS. 10 and 11 confirm that the test cells prepared using only the layered structure or only the organic solvent having a high dielectric constant had poor ionic conductivity. In contrast, the results illustrated in FIGS. 8 and 9 confirm that the ionic conductivity of each of the electrolytes prepared in Examples 1 and 2, which included both layered structure and organic solvent, was markedly enhanced (see the numbers of the digits of the values shown in the horizontal axes of FIGS. 8 and 9). The ion conduction is considered to be achieved presumably because the Li ions constituting the layered structure conducted ions since the organic solvents included in the electrolytes prepared in Examples 1 and 2 did not contain a supporting electrolyte dissolved therein. Since the electrolyte prepared in Comparative example 1 did not have ionic conductivity, it is considered that the conduction of Li ions is induced when both layered structure and organic solvent (DMSO) are present, that is, when the organic solvent is present. As illustrated in FIG. 12, the impedance curve had an arc-shaped portion in Comparative example 3, where the layered structure was composed of a reduced alkali metal salt of an aromatic dicarboxylic acid. The arc-shaped portion represents a change in impedance which occurs when both electrons and ions migrate simultaneously. It is considered that both electrons and ions were capable of migrating through the electrolyte in Comparative example 3 because the occlusion and release of Li ions were possible. The above results confirm that the electrolytes prepared in Examples 1 and 2 did not have electron conductivity but ionic conductivity only.

Figure 13:
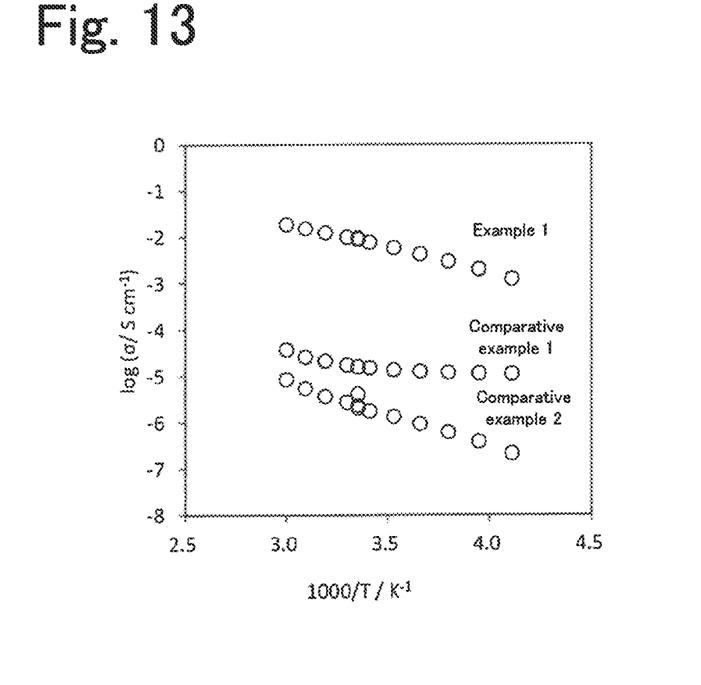
FIG. 13 illustrates Arrhenius plots obtained in Example 1 and Comparative examples 1 and 2.
Figure 14:
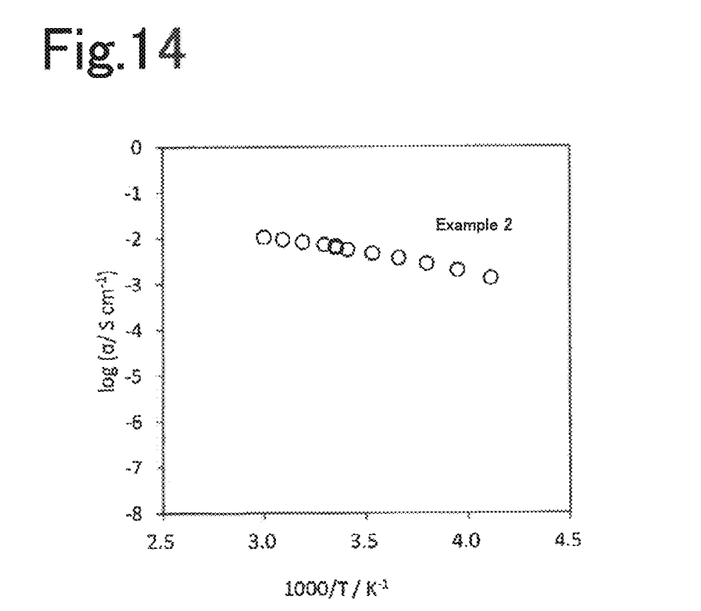
FIG. 14 illustrates an Arrhenius plot obtained in Example 2.

FIG. 13 illustrates Arrhenius plots obtained in Example 1 and Comparative examples 1 and 2. FIG. 14 illustrates an Arrhenius plot obtained in Example 2. Table 1 summarizes the details of the samples used in Examples 1 and 2 and Comparative examples 1 to 3 and the ionic conductivities (S/cm) of the samples at 25° C. The results shown in Table 1 and FIGS. 13 and 14 confirm that the samples prepared in Examples 1 and 2 consistently had higher ionic conductivity than those prepared in Comparative examples 1 and 2 in a relatively wide range.

TABLE 1

| | Electrolyte | | Ionic conductivity |
| --- | --- | --- | --- |
| | Layered structure[1] | Organic solvent | (25° C.) mS/cm |
| Example 1 | Naph-Li | Dimethyl sulfoxide | 8.9 |
| Example 2 | Naph-Li | Propylene carbonate | 7.1 |
| Comparative example 1 | Naph-Li | — | $1.6 \times 10^{-2}$ |
| Comparative example 2 | — | Dimethyl sulfoxide | $4.1 \times 10^{-3}$ |
| Comparative example 3 | Naph-Li | Dimethyl sulfoxide | $1.6 \times 10^{-2}$ |

[1]Naph-Li: Naphthalene dicarboxylate dilithium

The present application claims priority from Japanese Patent Application No. 2017-203483 filed on Oct. 20, 2017, the entire contents of which are incorporated herein by reference.

What is claimed is:
1. An energy storage device comprising:
a positive electrode including a positive electrode active material;
a negative electrode including a negative electrode active material; and a layered solid electrolyte interposed between the positive electrode and the negative electrode, the layered solid electrolyte conducting alkali metal ions and comprising:
an organic crystal layer including an insulating layered structure, the insulating layered structure including an organic skeletal layer including aromatic dicarboxylic acid anions having an aromatic ring structure and an alkali metal element layer including an alkali metal element to which oxygen included in carboxylic acid anions of the organic skeletal layer are coordinated to form a skeleton; and
an organic solvent charged in the organic crystal layer,
wherein the aromatic dicarboxylic acid anions having the aromatic ring structure include at least one of (i) a non-fused polycyclic structure in which two or more aromatic rings are linked together, and (ii) a fused polycyclic structure in which two or more aromatic rings are fused together, and the layered structure includes an alkali metal salt selected from the group consisting of 4,4'-biphenyldicarboxylic acid and 2,6-naphthalenedicarboxylic acid, and
wherein the negative electrode active material has a higher operating voltage than the insulating layered structure included in the layered solid electrolyte.

2. The energy storage device according to claim 1, wherein the organic solvent has a dielectric constant of 10 or more.

3. The energy storage device according to claim 1, wherein the organic solvent is one or more of dimethyl sulfoxide, dimethylformamide, and propylene carbonate.

4. The energy storage device according to claim 1, wherein the organic solvent does not include a supporting electrolyte.

5. The energy storage device according to claim 1, wherein the alkali metal element layer of the insulating layered structure includes one or more of lithium, sodium, and potassium.

6. The energy storage device according to claim 1, wherein the organic crystal layer is one or more of a self-standing film and a self-standing plate-like body.

7. The energy storage device according to claim 1, wherein the organic crystal layer is packed with the insulating layered structure at a packing ratio of 0.8 or more by volume.

8. The energy storage device according to claim 1, wherein a portion of the insulating layered structure which is other than the alkali metal element layer does not include an alkali metal.

9. The energy storage device according to claim 1, further comprising a bipolar electrode, the bipolar electrode including a current collector, a positive electrode mixture layer disposed on a surface of the current collector, the positive electrode mixture layer including the positive electrode active material, and a negative electrode mixture layer disposed on another surface of the current collector, the negative electrode mixture layer including the negative electrode active material, the current collector being capable of alloying with the alkali metal at a potential lower than a redox potential of the negative electrode active material, and the electrolyte interposed between the positive electrode mixture layer and the negative electrode mixture layer disposed on an adjacent current collector, wherein a plurality of the bipolar electrodes are stacked on top of one another with the layered solid electrolyte being interposed between each adjacent two of the bipolar electrodes.

10. The energy storage device according to claim 9, wherein the current collector is composed of a metal containing aluminum.

11. The energy storage device according to claim 1, wherein the negative electrode includes a negative electrode active material that provides a negative electrode having a potential of more than 1.0 V versus a lithium reference.

* * * * *